US008493882B2

(12) United States Patent
Miyoshi

(10) Patent No.: US 8,493,882 B2
(45) Date of Patent: Jul. 23, 2013

(54) OPTIMIZATION EVALUATION SYSTEM, OPTIMIZATION EVALUATION DEVICE, OPTIMIZATION EVALUATION METHOD, AND OPTIMIZATION EVALUATION PROGRAM

(75) Inventor: Kazunori Miyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 276 days.

(21) Appl. No.: 12/991,779

(22) PCT Filed: Apr. 9, 2009

(86) PCT No.: PCT/JP2009/057268
§ 371 (c)(1),
(2), (4) Date: Nov. 9, 2010

(87) PCT Pub. No.: WO2009/145011
PCT Pub. Date: Dec. 3, 2009

(65) Prior Publication Data
US 2011/0058498 A1    Mar. 10, 2011

(30) Foreign Application Priority Data

May 29, 2008  (JP) ................................. 2008-141283

(51) Int. Cl.
*G08C 15/00*    (2006.01)
*H04J 1/00*     (2006.01)
*H04J 3/22*     (2006.01)
*H04L 12/24*    (2006.01)
*H04L 12/26*    (2006.01)

(52) U.S. Cl.
USPC ........... 370/253; 370/230; 370/232; 370/235; 370/389

(58) Field of Classification Search
USPC ................. 370/230–236, 250–252, 412–470; 709/220–224
See application file for complete search history.

(56) References Cited

U.S. PATENT DOCUMENTS 6,144,639 A * 11/2000 Zhao et al. .................... 370/235
7,724,660 B2 * 5/2010 Segel ......................... 370/230.1

OTHER PUBLICATIONS

International Search Report for PCT/JP2009/057268 mailed Jul. 14, 2009.
J. C. Doyle et al., "Robustness and the Internet: Theoretical Foundations", Mar. 5, 2002, <Internet> [http://www.maoz.com/~dmm/complexity_and_the_internet/robustness_and_the_internet_theoretical_foundations.pdf].
M. Takayasu et al., "Dynamic phase transition observed in the Internet traffic flow", Physica. A, vol. 277, 2000, pp. 248-255.
K. Fukuda et al., "Origin of critical behavior in Ethernet traffic", Physica A, vol. 287, 2000, pp. 289-301.
K. Fukuda et al., "A cause of self-similarity in TCP traffic", International Journal of Communication Systems, 2005, pp. 603-617.

(Continued)

*Primary Examiner* — Andrew Lai
*Assistant Examiner* — Chuong M Nguyen

(57) ABSTRACT

Provided is an optimization evaluation system, wherein the effect of the optimization of traffic characteristic in a communication network is quantitatively evaluated. An optimization evaluation system which evaluates effects of optimization done by an optimization function in a communication network that has the optimization function for optimizing a communication traffic characteristic, including: a communication traffic analyzing module which acquires a communication traffic variation distribution based on measured communication traffic data; and a communication traffic evaluation module which executes processing for quantitatively evaluating the effects of the optimization of the communication traffic characteristic executed by the optimization function based on a fact whether or not the variation distribution calculated by the communication traffic analyzing module is a power function.

19 Claims, 7 Drawing Sheets

OTHER PUBLICATIONS

S. Abe et al., "Performance Evaluation Method by Using Observed Traffic Data for an Academic Information Network", IEICE Technical Report, vol. 103, No. 492, 2003, pp. 31-36, IN2003-139.

K. Fukuda et al., "Phase Transition Phenomena Originating in Network Protocols", IEICE Technical Report, vol. 101, No. 8, 2001, pp. 1-6, NS2001-10.

H. Hashimoto et al., "Algorithms for Estimating Flow Rate Distribution by Packet Sampling", IEICE Technical Report, vol. 106, No. 578, 2007, pp. 507-512, IN2006-265.

T. Ozawa, "New Trend in the Theories for Queueing Systems and Performance Evaluation", Systems, Control and Information, vol. 43, No. 3, 1999, p. 117-122.

* cited by examiner

OPTIMIZATION EVALUATION SYSTEM, OPTIMIZATION EVALUATION DEVICE, OPTIMIZATION EVALUATION METHOD, AND OPTIMIZATION EVALUATION PROGRAM

This Application is the National Phase of PCT/JP2009/057268, filed Apr. 9, 2009, which claims the Priority right based on Japanese Patent Application No. 2008-141283 filed on May 29, 2008 and the disclosure thereof is hereby incorporated by reference in its entirety.

TECHNICAL FIELD

The present invention relates to an optimization evaluation system, an optimization evaluation device, an optimization evaluation method, and an optimization evaluation program, which evaluate effects of optimizations executed by an optimization function of a communication network that is provided with the optimization function for optimizing the communication traffic characteristics.

BACKGROUND ART

"Optimization" generally means to conduct the best decision under a certain condition or to select the best one from a number of alternatives. A problem of such optimization is put into a following formula as a mathematical model.

"Find a value of a variable with which a function showing the scale of desirableness called an objective function becomes the maximum or minimum, under a given limited condition."

Note that there are a plurality of variables in general, so that those are expressed with n-order vector, and the optimization problem is expressed as in a following expression (1).

Objective function: f(x)→minimum

Limited condition: x∈S    Expression (1)

In Expression (1), the objective function f is a real-valued function defined on an appropriate aggregate including S. Further, S shows an aggregate of values the variable x can take in this optimization problem.

Furthermore, the optimization described above is conducted on the Internet that is a communication network. For example, with the TCP protocol, there is a mechanism called a slow start for controlling the transmission amount of the communication traffic to optimum so as to avoid expansion of traffic congestion on the network. Further, back pressure congestion control (a method which transmits a collision signal to the transmission side to hold transmission of a station on a segment) in the Ethernet (registered trademark), a method using "PAUSE command" which performs flow control in a MAC control protocol, and the like have been put into practical use.

Other than those described above, an optimization method for transferring only the traffic for a certain special application as fast as possible on the communication network, etc., is employed on a P2P (Peer-to-Peer) network and the like.

For a long period of time, researchers of the Internet traffic had thought that the traffic exhibits random variations. However, in 1994, it was reported by Leland and others that there is a self-similarity in the traffic. Ever since, there have been a great number of researches done on the behaviors of the Internet traffic. For example, Fukuda and Takayasu of NTT and others have shown that cumulative probability density distribution of a communication traffic variation shows a phase transition phenomenon, and appears as a power-law distribution with an exponent of −1 when the origin at a critical point is taken as 10 to the power of 0 (i.e., "1"). Some observation data are presented to show that the distribution at the critical point becomes the power law with an exponent of −1 in the phase transition phenomenon of the cumulative probability density distribution.

Further, a group of J. C. Doyle, S. H. Low and others as well as Fukuda and others have reported that the main factor of such traffic behavior is due to the feedback control in TCP and the Ethernet and the mechanism itself of the buffer function (or delay) in the feedback (see Non-Patent Document 1-Non-Patent Document 3). Further, it has been confirmed that the traffic efficiency becomes the maximum at the critical point in the phase transition of the system that has such mechanism (see Non-Patent Document 4).

In the meantime, it is known that there is a possibility that the power law is not applied in the traffic of each application unlike the case of the total traffic and that the aggregate traffic thereof regarding P2P and Web that are the currently dominant traffics exhibit the power law. However, these are only recognized as the phenomena, and there is no case of example where the phenomena are used in the evaluation of the communication traffic optimization technique.

Including those presented as the examples above, basically the effectiveness of the communication traffic optimization control techniques is only confirmed by a simple network model in simulations. Thus, whether or not the optimization techniques are really optimum (i.e., whether or not the objective function is the minimum or maximum) cannot be grasped on the actual Internet and other communication networks.

Non-Patent Document 1: John C. Doyle, etc., "Robustness and the Internet: Theoretical Foundations" Mar. 5, 2002.

Non-Patent Document 2: Misako Takayasu, etc., "Dynamic phase transition observed in the Internet traffic flow", Sep. 21, 1999.

Non-Patent Document 3: Kensuke Fukuda, etc., "Origin of critical behavior in Ethernet traffic" Jul. 21, 2000.

Non-Patent Document 4: Kensuke Fukuda, etc., "A case of self-similarity in TCP traffic", Mar. 15, 2005.

DISCLOSURE OF THE INVENTION

Problems to be Solved by the Invention

In the communication traffic optimization control methods, the structure of the model network in the simulation and various conditions thereof are different from the structures of actual networks and conditions thereof. Therefore, in general, the effects acquired by employing the optimization techniques regarding the traffic characteristic of the large-scaled communication network cannot be grasped quantitatively.

It is therefore an object of the present invention to provide an optimization evaluation system, an optimization evaluation device, an optimization evaluation method, and an optimization evaluation program, which can quantitatively evaluate the effects of the optimization of the traffic characteristic in the communication network.

Means for Solving the Problems

The optimization evaluation system according to the present invention is an optimization evaluation system which evaluates effects of optimization done by an optimization function in a communication network that has the optimization function for optimizing a communication traffic characteristic, and the system is characterized to include: a communication traffic analyzing module which acquires a communication traffic variation distribution based on measured communication traffic data; and a communication traffic evaluation module which executes processing for quantitatively evaluating the effects of the optimization of the communication traffic characteristic executed by the optimization function based on a fact whether or not the variation distribution calculated by the communication traffic analyzing module is a power function.

The optimization evaluation device according to the present invention is an optimization evaluation device which evaluates effects of optimization done by an optimization function in a communication network that has the optimization function for optimizing a communication traffic characteristic, and the device is characterized to include: a communication traffic analyzing module which acquires a communication traffic variation distribution based on measured communication traffic data; and a communication traffic evaluation module which executes processing for quantitatively evaluating the effects of the optimization of the communication traffic characteristic executed by the optimization function based on a fact whether or not the variation distribution calculated by the communication traffic analyzing module is a power function.

The optimization evaluation method according to the present invention is an optimization evaluation method which evaluates effects of optimization done by an optimization function in a communication network that has the optimization function for optimizing a communication traffic characteristic, and the method is characterized to include: acquiring a communication traffic variation distribution based on measured communication traffic data; and executing processing for quantitatively evaluating the effects of the optimization of the communication traffic characteristic executed by the optimization function based on a fact whether or not the calculated variation distribution is a power function.

The optimization evaluation program according to the present invention is an optimization evaluation program for evaluating effects of optimization done by an optimization function in a communication network that has the optimization function for optimizing a communication traffic characteristic, and the program is characterized to cause a computer to execute: a function that acquires a communication traffic variation distribution based on measured communication traffic data; and a function that executes processing for quantitatively evaluating the effects of the optimization of the communication traffic characteristic executed by the optimization function based on a fact whether or not the variation distribution calculated is a power function.

The present invention makes it possible to quantitatively evaluate the effects of the optimization of the traffic characteristic in the communication network.

BEST MODES FOR CARRYING OUT THE INVENTION

Hereinafter, embodiments of the present invention will be described by referring to the drawings.

First Embodiment

Hereinafter, a first embodiment of the present invention will be described by referring to the drawings. The embodiments of the present invention relate to an optimization technique which optimizes the traffic characteristic in a communication network, particularly in a communication network that has a feedback mechanism and a buffer (or delay) function, and relate to an evaluation method of the optimization technique.

As described above, in general, in the communication traffic optimization control techniques, the structure of the model network in the simulation and various conditions thereof are different from the structures of actual networks and conditions thereof. Thus, as a first issue, it is not possible in general to quantitatively grasp the effects that are acquired by employing the optimization techniques regarding the traffic characteristic of the large-scaled communication network.

Further, in the communication traffic optimization control methods, the structures of the model networks in the simulation and various conditions used in verifications of the effects of each optimization technique are different from each other, and there is no quantitativeness in evaluations of optimization as mentioned in the section of the first issue. Furthermore, in a typical algorithm for optimizing the communication traffic, basically, the communication traffic is observed and is fed back with a delay of specific time (use of a statistic, or the like). However, in that case, it is not confirmed that the variation distribution of the communication traffic shows a phase transition, the variation distribution of the communication traffic at the critical point exhibits a power law, and the efficiency of the communication traffic becomes the maximum. Therefore, as a second issue, it is not possible in general to compare the effect acquired by employing the optimization technique for the traffic characteristic of the large-scaled communication network with the effect acquired by other optimization techniques.

Thus, the embodiment of the present invention provides an evaluation system that is capable of evaluating how optimally the optimization technique or the variables set in the optimization technique are working in regards to the optimization technique that optimizes some kind of communication traffic efficiency by paying attentions to the fact that the traffic efficiency of the communication network, particularly the communication network having the feedback mechanism and the buffer (or delay) function becomes the optimum at the critical point of the phase transition and the communication traffic variation distribution at that time exhibits the power law.

Further, the present invention provides an evaluation system that is capable of quantitatively evaluating the effectiveness of the optimization technique and the effectiveness of the variables set in the optimization technique in regards to the optimization technique that optimizes some kind of communication traffic efficiency by paying attentions to the fact that the traffic efficiency of the communication network, particularly the communication network having the feedback mechanism and the buffer (or delay) function becomes the optimum at the critical point of the phase transition and the communication traffic variation distribution at that time exhibits the power law.

FIG. 1 is a block diagram showing an example of the structure of the optimization evaluation system according to the embodiment of the present invention. As an embodiment of the present invention, FIG. 1 shows the structure of the system that is capable of quantitatively grasping an evaluation method for evaluating how optimally the optimization technique or the variables set in the optimization technique is working and the effectiveness thereof in regards to the optimization technique that optimizes the traffic characteristic of the communication network, particularly the communication network having the feedback mechanism and the buffer (or delay) function.

In this embodiment, the optimization evaluation system can be applied to the usages of evaluating the effects of the optimization of the communication traffic characteristics of the Internet, networks managed by Internet service providers, and local area networks (LAN), which are the existing communication networks, as well as almost all of other small-scaled or large-scaled communication networks. Particularly, the optimization evaluation system can be applied to the usages of quantitatively evaluating the effectiveness of the optimization technique used for the traffic characteristic of the communication network having the feedback mechanism and the buffer (or delay) function and the effectiveness of the optimization variables. Further, the optimization evaluation system can be applied to the usages of evaluating how optimally the optimization techniques or the variables set in the optimization techniques are working.

As shown in FIG. 1, the optimization evaluation system includes a plurality of routers 1 (1a-1, 1a-2, - - - , 1b-1, 1b-2, - - - ), band control devices 2a, 2b, and traffic monitors 3a, 3b. While two band control devices 2a and 2b are illustrated in FIG. 1, the number of the band control devices is not limited to "2". For example, the optimization evaluation system may include three or more band control devices. Further, while two traffic monitors 3a and 3b are illustrated in FIG. 1, the number of the traffic monitors is not limited to "2". For example, the optimization evaluation system may include three or more traffic monitors.

Hereinafter, when expressing the band control devices 2a, 2b in general or indicating either one of the band control devices 2a, 2b, the band control devices or the band control device may simply be expressed as the band control device 2 as well. Further, hereinafter, when expressing the traffic monitors 3a, 3b in general or indicating either one of the traffic monitors 3a, 3b, the traffic monitors or the traffic monitor may simply be expressed as the traffic monitor 3 as well.

In FIG. 1, the router 1 is provided with a function of transferring an arrived communication packet to a next router according to a route control setting depicted in the router itself. Specifically, the router 1 stores a route table for performing the route control in a storage section such as a memory in advance. When receiving the communication packet, the router 1 performs the route control according to the content set in the route table, and transmits the received communication packet to the next router.

Further, in FIG. 1, the band control device 2 is achieved by a shaping/filtering device, for example. The band control device 2 is provided with a function of judging whether or not to transfer the arrived communication packet to the next router according to the control setting depicted in the device itself. Further, the band control device 2 is provided with a function of transferring only the communication packet that is set to be transferable to the next router.

Specifically, the band control device 2 stores the route table for judging whether or not to conduct transfer and for performing the route control in the storage section such as a memory in advance. When receiving the communication packet, the band control device 2 judges whether or not to transfer the received packet according to the content set in the route table. When judging that it is transferable, the band control device 2 transmits the communication packet to the next router according to the content set in the route table. In the meantime, when judging that it is nontransferable, the band control device 2 controls not to transmit the communication packet to the next router.

Specifically, the traffic monitor 3 is achieved by an information processor such as a personal computer that operates according to a program. In the embodiment, the traffic monitor 3 is disposed at a hub in principle regardless of the fact that the network topology is known or unknown.

As shown in FIG. 1, the traffic monitor 3 is provided with a function of observing the state of the traffic on the outlet line side of the router 1 according to the monitoring function setting depicted in itself. Specifically, the traffic monitor 3 stores a monitoring table for monitoring the traffic in the storage section such as a memory in advance. The traffic monitor 3 monitors the state of the traffic on the outlet line side of the router 1 according to the content set in the monitoring table.

Further, the traffic monitor 3 is placed on the output line side of the router that is at least one hop before the router where the band control device 2 is placed on its outlet line side in order to make it possible to observe as many kinds of communication traffics as possible. In the example shown in FIG. 1, there is illustrated a case where the traffic monitor 3a, for example, is placed on the outlet line side of the router 1a-2 that is one hop before the router 1a-1 where the band control device 2a is placed on its outlet line side. In this case, specifically, the traffic monitor 3a may be placed at the router 1a-3 that is two hops before the band control device 2a. Further, for example, there is also illustrated a case where the traffic monitor 3b is placed on the outlet line side of the router 1b-2 that is one hop before the router 1b-1 where the band control device 2b is placed on its outlet line side. In this case, specifically, the traffic monitor 3b may be placed at the router 1b-3 that is two hops before the band control device 2b.

Each of regions 40a and 40b shown in FIG. 1 is a communication network. The regions 40a and 40b are the range of the network that can be observed by a main body that configures a system capable of quantitatively grasping the evaluation method which evaluates how optimum the optimization technique or the variable set in the optimization technique is working and the effectiveness thereof in regards to the optimization technique which optimizes the traffic characteristic of the communication network that has the feedback mechanism and the buffer (delay) function in particular. In this embodiment, for example, the traffic monitor 3a can monitor the communication traffic of the communication network shown as the region 40a. Further, for example, the traffic monitor 3b can monitor the communication traffic of the communication network shown as the region 40b.

When the regions 40a and 40b are to be expressed generally or when either the region 40a or the region 40b is to be expressed, simply "the region 40" may also be employed hereinafter.

At least one traffic monitor 3 is placed within the observable range 40. The traffic monitor 3 calculates the cumulative probability density distribution (CDF) of the variations in the communication traffic characteristic which satisfies $X \geq x$ or the complementary distribution (CCDF) of the cumulative probability density distribution (CDF) of the variations in the communication traffic characteristic which satisfies $X < x$, in regards to the traffic characteristic to be optimized which can be expressed by the traffic variation distribution directly or indirectly and the variable X. The variable X is the size of congestion continued time, the packet roundtrip time (RTT), or the like, for example. Further, the value x is a numerical value of the congestion continued time or the packet roundtrip time observed by the traffic monitor 3, for example. Further, the traffic monitor 3 holds (stores) the measurement start time and the measurement end time of the congestion continued time and the packet roundtrip time in a memory module 5 to be described later.

FIG. 2 is a block diagram showing an example of the structure of the traffic monitor 3 shown in FIG. 1. As shown in FIG. 2, the traffic monitor 3 includes a communication traffic monitor section 4, a communication traffic analyzing section 5, a memory module 6, a communication traffic evaluation section 7, and a feedback section 8.

Specifically, the communication traffic monitor section 4 is achieved by a CPU and a network interface section of an information processor that operates according to a program. The communication traffic monitor section 4 has a function of observing the communication traffic and monitoring the packet size, packet arrival interval, and the like thereof. Specifically, the communication traffic monitor section 4 receives a communication packet from the router 1, and measures the packet size and the packet arrival interval of the received communication packet.

Specifically, the communication traffic analyzing section 5 is achieved by the CPU of the information processor that operates according to the program. The communication traffic analyzing section 5 has a function (1) of rebuilding observed data for each traffic characteristic (packet length, packet arrival interval, and the like) based on the communication traffic observed result acquired by the communication traffic monitor section 4. Further, the communication traffic analyzing section 5 has a function (2) of calculating the cumulative probability density distribution (CDF) of the variations in the communication traffic characteristic which satisfies $X \geq x$ or the complementary distribution (CCDF) of the cumulative probability density distribution (CDF) of the variations in the communication traffic characteristic which satisfies $X < x$, in regards to the traffic characteristic to be optimized which can be expressed by the traffic variation distribution directly or indirectly and the variable X.

Specifically, the memory module 6 is achieved by a memory provided to the information processor or a storage device such as a hard disk device. The memory module 6 holds (stores) (1) threshold values (preset values) of each traffic characteristic, (2) traffic characteristics (packet length, packet arrival interval, and the like), and (3) observation start/end time of each packet.

Specifically, the traffic evaluation section 7 is achieved by the CPU of the information processor that operates according to the program. The communication traffic evaluation section 7 has a function (1) of comparing the observed data of each traffic characteristic (packet length, the packet arrival interval, and the like) with a power function with an exponent of −1 when the origin is taken as 10 to the power of 0 (i.e., "1"). Further, the communication traffic evaluation section 7 has a function (2) of evaluating (judging) whether the observed communication traffic is in a state with a sufficient margin in regards to the limits of the buffer, the communication band, and the like of the router 1 or in a state with congestion generated by exceeding the limits. Further, the communication traffic evaluation section 7 has a function of evaluating (calculating) the extent of the margin and the extent of the congestion.

Specifically, the feedback section 8 is achieved by the CPU and the network interface section of the information processor that operates according to the program. The feedback section 8 has a function of feeding back the evaluation result acquired by the communication traffic evaluation section 7 to a device/system having the optimization function which optimizes the communication traffic characteristic according to the optimization technique.

For example, the feedback section 8 transmits information showing the evaluation result acquired by the communication traffic evaluation section 7 to the band control device 2 that is achieved by a shaping/filtering device. Further, for example, the feedback section 8 may transmit information showing the evaluation result acquired by the communication traffic evaluation section 7 to the device/system which achieves slow-start algorithm in TCP retransmission control. Furthermore, for example, the feedback section 8 may transmit the information showing the evaluation result acquired by the communication traffic evaluation section 7 to a device/system which achieves backoff control on the Ethernet. Moreover, for example, the feedback section 8 may transmit the information showing the evaluation result acquired by the communication traffic evaluation section 7 to a device/system which achieves a network filter (NW filter: e.g., filter which allows only data of a certain application to pass through).

The structure of the optimization evaluation system has been described above. However, the measure for feedback to the device/system having the optimization function which optimizes the communication traffic characteristic according to the optimization technique in the feedback section 8 shown in FIG. 2 and the use method of the evaluation result acquired by the communication traffic evaluation section 7 using the optimization technique are well-known to those skilled in the art, and those are not the direct feature points of the present invention. Therefore, explanations of the detailed structures thereof are omitted.

Further, in the embodiment, the storage device (not shown) of the traffic monitor 3 stores various kinds of programs for evaluating the effects of optimization achieved by the optimization function of the communication network that has the optimization function for optimizing the communication traffic characteristic. For example, the storage device of the traffic monitor 3 stores an optimization evaluation program which causes a computer to execute: communication traffic analyzing processing for acquiring variation distribution of the communication traffic based on the measured communication traffic data; and communication traffic evaluation processing which executes processing for quantitatively evaluating the effects of the optimization of the communication traffic characteristic executed by the optimization function based on the fact whether or not the calculated variation distribution is a power function.

Next, operations will be described. Hereinafter, described are the operations of the optimization evaluation system which is capable of evaluating how optimally the optimization technique for optimizing the traffic characteristic of the communication network or the variables set in the optimization technique are working in regards to the optimization technique which optimizes the traffic characteristic of the communication network that has the feedback mechanism and the buffer (or delay) function in particular and is capable of quantitatively grasping the effectiveness of the optimization. FIG. 3 is a flowchart showing an example of the processing executed by the optimization evaluation system to evaluate the effects of the optimization of the communication traffic characteristic.

(α) First, the optimization evaluation system is built in a following manner by providing two advance preparation stages.

Preparation 1: The traffic monitor 3 is provided in advance with the function of calculating the cumulative probability density distribution (CDF) which satisfies $X \geq x$ in regards to the traffic characteristic to be optimized, which can be expressed by the traffic variation distribution directly or indirectly, and the variable X. The variable X is the size of congestion continued time, the packet roundtrip time (RTT), or the like, for example. Further, the value x is a numerical value of the congestion continued time or the packet roundtrip time observed by the traffic monitor 3, for example.

Note here that "$X \geq x$" indicates a case where the value X of the variable is equal to or larger than a given value x. That is, "$X \geq x$" means that the value of the cumulative probability density distribution when the variable is X is the sum of the cumulative probability density distributions of all the cases where the variable is x or larger, when the horizontal axis on the coordinate space is the variation variable X and the vertical axis is the cumulative probability density distribution.

While the embodiment shows the case of acquiring the cumulative probability density distribution (CDF) which satisfies X≧x, the cumulative probability density distribution (CDF) which satisfies X<x may be acquired as well. In a case where the cumulative probability density distribution (CDF) which satisfies X<x is calculated, recalculation of the complementary cumulative probability density distribution (CCDF) that is the complementary distribution thereof can lead to the original cumulative probability density distribution (CDF) which satisfies X≧x. Therefore, as the cumulative probability density distribution (CDF), any distributions which satisfy X≧x or X<x can be calculated after all.

Preparation 2: The traffic monitor 3 is placed at the router 1 of two hops before or more of the band control device 2 to observe the total communication traffic on the outlet line side thereof. Considering the redundancy, it is desirable to provide at least two traffic monitors 3 within the observed region 40.

However, it is necessary for the traffic monitor 3 to be able to acquire all the variables X shown in Preparation 1 or most of them (for example, 90 percent or more) with respect to the communication traffic. As described above, this is for satisfying conditions such as "there is a possibility that the power law may not apply when it is not the total traffic but in the traffic of each application" and "regarding P2P and Web as the currently dominant traffic, it is known that the aggregate thereof exhibits the power law".

Through the advance preparations described above, the traffic monitor 3 observes the communication traffic communicated within the observed region 40 of the communication network at all times (step S101). Specifically, the traffic monitor 3 receives the communication packets from the router 1 of the previous stage, and measures the packet size and the packet arrival interval of the received packets.

Further, the traffic monitor 3 accumulates the data showing the observed communication traffic to the memory module 6 at all times (step S102). Specifically, the traffic monitor 3 accumulates the data of the measured packet size and packet arrival interval to the memory module 6 at all times.

Further, the traffic monitor 3 calculates the variation cumulative probability density distribution (CDF) of the communication traffic which satisfies X≧x at prescribed timing (for example, by every prescribed time) (step S103). The traffic monitor 3 may calculate the complementary distribution (CCDF) of the variation cumulative probability density distribution (CDF) of the communication traffic which satisfies X<x.

(β) Then, the traffic monitor 3 judges whether the variation cumulative probability distribution (CDF) of the observed communication traffic characteristic or the complementary cumulative probability density distribution (CCDF) shows the power law by using the calculation function loaded in advance in Preparation 1 (step S104). Hereinafter, the processing for judging whether or not the distribution shows the power law will be described by referring to FIG. 3.

The traffic monitor 3 executes processing for fitting the variation cumulative probability density distribution of the communication traffic characteristic and the power function with an exponent of −1 when the origin is taken as 10 to the power of 0 (i.e., "1") by using the calculation function loaded in advance in Preparation 1 through the use of a curve of a least-square or the like or the use of a linear approximation method.

However, in general, the region with a large value of the observed variable in the variation cumulative density distribution of the communication traffic characteristic decreases in exponentially by the upper limit of the buffer size of the router 1, the upper limit of the communication capacitance, and the like. Further, the region with a small value of the observed variable is saturated due to its rough precision since a normal observation is conducted by sampling. Based upon those reasons, the region for fitting the power function with an exponent of −1 when the origin is taken as 10 to the power of 0 (i.e., "1") needs to be between those regions.

Further, the traffic monitor 3 judges whether the power function with an exponent of −1 when the origin is taken as 10 to the power of 0 (i.e., "1") fits the variation cumulative probability density distribution of the communication traffic characteristic acquired by the observation within a range of 1 decade (1 digit) or more. Further, the traffic monitor 3 judges whether or not the distribution shows the power law by having the fact that the power function fits the distribution in a range of 1 decade (1 digit) or more as a condition for the variation cumulative probability density distribution of the communication traffic characteristic acquired by the observation to show the power law. Further, when the traffic monitor 3 judges that it shows the power law (Y of step S104), the traffic monitor 3 defines the region showing the power law as a scaling region and stores the scaling region to the memory module 6 (step S105).

In the meantime, when judging that it is not the state showing the power law in the processing heretofore as a result of comparing the variation cumulative probability density distribution of the communication traffic characteristic and the power function with an exponent of −1 when the origin is taken as 10 to the power of 0 (i.e., "1") by using the calculation function loaded in advance in Preparation 1 (N in step S104), the traffic monitor 3 sets the scaling region to a range of 0 1 to 0.001 of the power function with an exponent of −1 when the origin is taken as 10 to the power of 0 (i.e., "1"). Then, the traffic monitor 3 stores the set scaling region to the memory module 6 (step S106).

Thereafter, the traffic monitor 3 evaluates the optimum characteristic of the optimization technique regarding the communication traffic characteristic and the set variables on the optimization technique based on the cumulative probability density distribution (or the complementary distribution thereof) and the scaling region acquired by executing the processing described above.

Specifically, the traffic monitor 3 evaluates (judges) whether the observed communication traffic has a sufficient margin in regards to the limits of the buffer, the communication band, and the like of the router 1 or there is congestion being generated by exceeding the limits. Further, when there is congestion being generated, the traffic monitor 3 evaluates (calculates) the extent of the margin and the extent of the congestion.

In a case where the communication traffic is not in an optimum state and in a state with a sufficient margin due to the applied optimization technique and the set variables on that optimization technique, the variation cumulative density distribution of the observed communication traffic characteristic comes to be on the lower side (negative side) with respect to the power function in the scaling region defined in (β) of the power function with the exponent of −1 when the cumulative probability density distribution takes the origin as 10 to the power of 0 (i.e., "1"). Inversely, in a case where there is congestion, the variation cumulative density distribution of the observed communication traffic characteristic comes to be on the upper side (positive side) with respect to the power function in the scaling region.

(A) Thus, in the scaling region defined in (β) described above, the traffic monitor 3 defines the directions of deviation from the optimum state by taking the case where the cumulative probability density distribution comes on the upper side as positive and the case where the cumulative probability density distribution comes on the lower side as negative assuming that a perpendicular is drawn to the power function with the exponent of −1 when the cumulative probability density distribution takes the origin as 10 to the power of 0 (i.e., "1"). Through this, the traffic monitor 3 can evaluate (judge) whether it is in a state with a margin in the communication traffic or in a state with congestion due to the employed optimization technique and the set variables on the optimization technique.

Specifically, the traffic monitor 3 judges whether the variation cumulative probability density distribution of the observed communication traffic characteristic is on the positive side or on the negative side with respect to the power function in the scaling region (step S107) based on the cumulative probability density distribution (or the complementary distribution) acquired in step S103 and the scaling region stored in the memory module 6 in steps S105 and S106.

When the variation cumulative probability density distribution of the observed communication traffic characteristic is on the positive side the power function with respect to the power function (upper in step S107), the traffic monitor 3 judges that it is in a state with no margin in the communication traffic by exceeding the optimum state (step S108). In the meantime, when the variation cumulative probability density distribution of the observed communication traffic characteristic is on the negative side with respect to the power function (lower in step S107), the traffic monitor 3 judges that it is in a state where there is a margin in the communication traffic until reaching the optimum state (step S109).

(B) Next, the traffic monitor 3 acquires the extent of the margin or congestion by defining it with a difference between the power function with the exponent of −1 when the cumulative probability density distribution takes the origin as 10 to the power of 0 (i.e., "1") and the variation cumulative probability density distribution of the communication traffic characteristic acquired by the observation in the scaling region defined in (β). That is, the traffic monitor 3 executes processing for evaluating the deviation amount from the optimum state of the communication traffic characteristic (step S110). In this case, the traffic monitor 3 acquires the difference by using the average value on the horizontal axis of the scaling region defined in (β) as the difference to be acquired.

Through executing the processing of (A) and (B) described above, the traffic monitor 3 can perform the quantitative evaluation of the extent of the optimum characteristic of the employed optimization technique and the set variables on the optimization technique. This makes it possible to quantitatively grasp the effectiveness of the optimization technique and the effectiveness of the optimization variables.

The method of "fitting the variation cumulative probability density distribution of the communication traffic characteristic and the power function with the exponent of −1 when the origin is taken as 10 to the power of 0 (i.e., "1") by using the calculation function loaded in advance in Preparation 1 through the use of a curve of a least-square or the like or the use of a linear approximation method" shown in (β) described above may also be the value itself that is acquired from the observed traffic data acquired by the traffic monitor 3. Further, the calculated data result may be applied to bilogarithm for showing a normal power law or the calculated data result may be used by taking either the vertical axis or the horizontal axis as semilogarithm.

Further, regarding "When judging that it is not the state of power law in the processing heretofore as a result of comparing the variation cumulative probability density distribution of the communication traffic characteristic to the power function with the exponent of −1 when the origin is taken as 10 to the power of 0 (i.e., "1") by using the calculation function loaded in advance in Preparation 1, the traffic monitor 3 sets the scaling region to a range of 0 1 to 0.001 of the power function with the exponent of −1 when the origin is taken as 10 to the power of 0 (i.e., "1"). Then, the traffic monitor 3 stores the set scaling region to the memory module 6" shown in (β) described above, the range of the power function with the exponent of −1 when the origin is taken as 10 to the power of 0 (i.e., "1") in the scaling region may be a range of an arbitrary 1 decade (1 digit) from 0.1 to 0.001 or more.

Further, as "a difference between the cumulative probability density distribution of the power function with the exponent of −1 and the variation cumulative probability density distribution of the communication traffic characteristic acquired by the traffic monitor 3 in the scaling region defined in (β) described above" which is "the extent of the margin or congestion" shown in (B) described above, the traffic monitor 3 may acquire it by some of the values on the horizontal axis of the scaling region defined in (β) described above. Further, the traffic monitor 3 acquires it by using the difference value of the largest values in the scaling region defined in (β) described above.

Further, as "a difference between the cumulative probability density distribution of the power function with the exponent of −1 and the variation cumulative probability density distribution of the communication traffic characteristic acquired by the observation in the scaling region defined in (β) described above" which is "the extent of the margin or congestion" shown in (B) described above, the traffic monitor 3 may acquire the difference according to the method shown in FIG. 4. That is, the traffic monitor 3 may acquire a value obtained by integrating the difference between the power function with the exponent of −1 when the origin is taken as 10 to the power of 0 (i.e., "1") and the cumulative probability density distribution of the data acquired by the observation with the traffic monitor 3 in the scaling region. As a way of example, FIG. 4 shows the difference between the power function and the cumulative probability density distribution in integral calculus in the variation cumulative probability density distribution of the communication traffic characteristic disclosed in Non-Patent Document 4.

Furthermore, as "a difference between the cumulative probability density distribution of the power function with the exponent of −1 and the variation cumulative probability density distribution of the communication traffic characteristic acquired by the traffic monitor 3 in the scaling region defined in (β) described above" which is "the extent of the margin or congestion" shown in (B) described above, the traffic monitor 3 may acquire the difference according to the method shown in FIG. 5. That is, the traffic monitor 3 may acquire a value obtained by translating the power function with the exponent of −1 when the origin is taken as 10 to the power of 0 (i.e., "1") to the end with a small value of the scaling region of the cumulative probability density distribution of the data acquired by the observation done by the traffic monitor 3 and by integrating the difference between the translated power function with the exponent of −1 and the cumulative probability density distribution of the data acquired by the traffic monitor 3 within the scaling region. As a way of example, FIG. 5 shows the difference between the power function and the cumulative probability density distribution in integral calculus in the variation cumulative probability density distribution of the communication traffic characteristic disclosed in Non-Patent Document 4.

Thereafter, the traffic monitor 3 feeds back the evaluation result acquired in steps S107-S110 to the device/system (e.g., the band control device 2) having the optimization function which optimizes the communication traffic characteristic according to the optimization technique. Specifically, the traffic monitor 3 transmits information showing whether or not there is a margin in the communication traffic and information showing whether or not there is congestion to the device/system having the optimization function. Further, for example, the traffic monitor 3 transmits information showing the extent of the margin in the communication traffic and the extent of the congestion to the device/system having the optimization function.

The system manager that manages the device/system (e.g., the band control device 2) having the optimization function operates a system managing terminal, for example, to check the evaluation result of the effects of the optimization achieved by the optimization function based on the evaluation information transmitted from the traffic monitor 3. In this case, the system managing terminal outputs (e.g., displays) the information showing whether or not there is a margin in the communication traffic and the information showing whether or not there is congestion, for example, based on the evaluation information transmitted from the traffic monitor 3. Further, for example, the system managing terminal outputs (e.g., displays) the information showing the extent of the margin and the extent of the congestion in the communication traffic.

Furthermore, for example, the system managing terminal may illustrate the relation between the variation cumulative probability distribution of the communication traffic and the power function on a coordinate axis or may illustrate the integration value acquired as the extent of the margin or the extent of the congestion as shown in FIG. 4 and FIG. 5 based on the evaluation information transmitted from the traffic monitor 3.

Further, for example, it is also possible to output the information regarding whether or not there is a margin in the communication traffic or where or not there is congestion by dividing it into levels of a plurality of stages. In that case, for example, the traffic monitor 3 judges whether or not the acquired values of the extent of the margin and congestion are equal to or larger than a first threshold value. When those values are equal to or larger than the first threshold value, the traffic monitor 3 judges that the margin level and the congestion level of the communication traffic are "large". Further, when the acquired values of the extent of the margin and congestion are smaller than the first threshold value but equal to or larger than a second threshold value, the traffic monitor 3 judges that the margin level and the congestion level of the communication traffic are "medium". Furthermore, when the acquired values of the extent of the margin and congestion are smaller than the second threshold value, the traffic monitor 3 judges that the margin level and the congestion level of the communication traffic are "small". Then, the system managing terminal outputs (displays) the margin level and the congestion level of the communication traffic in three stages of "large", "medium", and "small", for example, based on the evaluation result from the traffic monitor 3.

Further, the system manager judges whether or not it is necessary to change the various kinds of set variables and the like for optimizing the communication traffic characteristic based on the outputted evaluation result, and judges what values the set variable values to be changed. Then, the system manager operates the system managing terminal, for example, to perform an operation for changing the setting of the device/system (e.g., the band control device 2) which has the optimization function.

According to the operation done by the system manager, the device/system (e.g., the band control device 2) having the optimization function executes the processing for changing the set variables and the like for optimizing the communication traffic characteristic based on the evaluation result from the traffic monitor 3. For example, when the device/system having the optimization function is a device/system which achieves a network filter, the device/system performs the processing for changing the packet size and port number in the network filter according to the operation of the system manager.

As described above, the embodiment acquires the cumulative probability density distribution (CDF) of the communication traffic based on the observed (measured) communication traffic data, and executes the processing for quantitatively evaluating the effects of the optimization of the communication traffic characteristic executed by the optimization function based on the fact whether or not the calculated cumulative probability density distribution (CDF) exhibits the power function. That is, the effects of the optimization is quantitatively evaluated based on the observed data of a given existing communication network. Thus, it is possible to perform the optimization technique employed to the traffic characteristic of the communication network and benchmark of the optimization technique at least with a relative quantitativeness. Therefore, the effects of the optimization of the traffic characteristic of the communication network can be evaluated quantitatively. Further, it is possible to compare the effects acquired by employing the optimization technique for the traffic characteristic of a large-scaled communication network with the effects acquired by using other optimization techniques.

The effects described above are acquired by utilizing such characteristic that the variation of the traffic characteristic exhibits the power law at the time of the optimum efficiency when the total communication traffic is observed even if the measured data acquired by a local measurement is used. That is, it is because phase transition and generation of the power law at the critical point thereof is acquired by measuring the total communication traffic, and further the power law exhibits the self similarity (i.e., does not depend on the measurement scale).

With the embodiment, the power law exhibits the self similarity (i.e., does not depend on the measurement scale, and does not depend on the system size), so that the calculation amount when evaluating the effects of the optimization and the calculation resource therefore can be reduced greatly.

Further, with the embodiment, the traffic monitor 3 is disposed at the hub in principle whether the network topology is known or unknown. Therefore, variation errors in both ends (the part where the probability distribution is high or low) in the acquired cumulative probability density distribution (CDF) of the traffic or the complementary cumulative probability density distribution (CCDF) can be decreased.

Further, while it is defined in the embodiment in regards to the layout of the traffic monitor that "the traffic monitor 3 is placed at the router 1 of two hops before or more of the band control, device 2 to observe the total communication traffic on the outlet side thereof (considering the redundancy, it is desirable to provide at least two traffic monitors 3 within the observed region 40)", the layout method of the traffic monitor 3 is not limited only to the one shown in the embodiment. For example, the traffic monitor 3 may be disposed in a following manner depending on the structure of the target network topology, for example.

For example, (1) in a case where the topology of the network as the measurement target is unknown, a router 1 as the node is selected randomly from the routers with the maximum outdegree (output link number) by using the result searched by a traceroot command or the like. Then, the traffic monitor 3 is disposed selectively at the server that is connected to the selected router.

Further, for example, (2) in a case where the network topology is known and the outdegree distribution of the node exhibits the power law, the traffic monitor 3 is disposed on the server that is connected to the router (hub) with a large Betweenness (*).

Assuming that an arbitrary i-th router within the network is expressed as a router i, Betweenness of the router i is calculated by the number of the shortest route between arbitrary two routers, which passes through the node i (i.e., the router i). In general, in the network in which the degree of the router exhibits the power law, the distance between the arbitrary two nodes becomes short on average by going through the hub due to the small-world characteristic, so that the Betweenness of the hub tends to become high. However, while the router (bridge router) functioning to connect a router group and a router group only has a low degree, the Betweenness thereof becomes large.

Betweenness (B(v)) passing through a router v can be expressed by a following expression (2).

$$B(v) = \Sigma [\sigma_{w,w'}(v) / \sigma_{w,w'}]$$

$$w \neq w' \neq v \quad \text{Expression (2)}$$

Note here that $\sigma_{w,w'}$ in Expression (2) show the number of the shortest routes from the node w to the node w'. Further, $\sigma_{w,w'}(v)$ show the number of the shortest routes from the node w to the node w' passing through the node v.

As described above, the traffic monitor 3 may be disposed within the network according to the rules shown in (1) or (2).

Second Embodiment

Next, a send embodiment of the present invention will be described by referring to the drawings. FIG. 6 is a block diagram showing an example of the structure of an optimization evaluation system according to the second embodiment. As shown in FIG. 6, this embodiment is different from the first embodiment in respect that the optimization evaluation system includes a center node 9 in addition to the structural elements shown in FIG. 1.

As shown in FIG. 6, the information of the variation cumulative probability density distribution of the communication traffic characteristic observed by a plurality of traffic monitors 3 may be transmitted to the center node 9 regularly or irregularly or may be transmitted self-distributed manner or centralized control manner. Then, the center node 9 may compare the information of the cumulative probability density distribution of the communication traffic characteristic received from each traffic monitor 3 to detect errors.

In this embodiment, each traffic monitor 3 has a function of transmitting the information of the variation cumulative probability density distribution of the observed communication traffic characteristic at prescribed timing (for example, at every prescribed time), in addition to the functions shown in the first embodiment. Other functions of each traffic monitor 3 are the same as the functions shown in the first embodiment.

Specifically, the center node 9 is achieved by an information processor such as a personal computer that operates according to a program. The center node 9 has a function of comparing the information of the cumulative probability density distribution of the communication traffic characteristic received from each traffic monitor 3 to detect errors between the traffic monitors 3.

Further, the center node 9 receives the cumulative probability density distribution (CDF) of the observed traffic variation held (stored) in the memory module 6 of the traffic monitor 3 which satisfies $X \geq x$ (or may be the complementary distribution (CCDF) of the cumulative probability density distribution (CDF) which satisfies $X < x$), the observation start time, and the observation end time from each traffic monitor 3. Further, the center node 9 analyzes the time-series traffic variation for each traffic monitor by using the cumulative probability density distribution (or the complementary distribution), the observation start time, and the observation end time. Then, the center node 9 calculates a Lyapunov exponent thereof (or may be a Hurst exponent).

Through executing the processing described above, it is possible to evaluate whether or not the employed optimization technique and the set variables on the optimization technique can also be effective thereinafter in the communication traffic of the network, which changes chronologically.

The functions of the router 1 and the band control device 2 in this embodiment are the same as the functions of those shown in the first embodiment.

As described above, in addition to the effects shown in the first embodiment, it is possible with this embodiment to detect errors between the traffic monitors 3 since it is so structured that the center node 9 performs the processing for comparing the information of the cumulative probability density distribution received from each traffic monitor 3.

Further, the embodiment is structured to acquire the Lyapunov exponent and the Hurst exponent showing extremely small exponential speed of deviation from the orbit in an extremely long (or are acquired infinitely) time difference based on the cumulative probability density distribution (or the complementary distribution), the observation start time, and the observation end time, so that it is possible to evaluate whether or not the employed optimization technique and the set variables on the optimization technique are also effective thereinafter.

Next, the minimum structure of the optimization evaluation system according to the present invention will be described. FIG. 7 is a block diagram showing an example of the minimum structure of the optimization evaluation system. The optimization evaluation system is a system that evaluates the effects of optimization done by the optimization function of the communication network that has the optimization function for optimizing the communication traffic characteristic. As shown in FIG. 1, the optimization evaluation system includes at least the communication traffic analyzing section 5 and the communication traffic evaluation section 7 as the minimum structural elements.

The communication traffic analyzing section 5 has a function of acquiring the communication traffic variation distribution based on the measured communication traffic data. Further, the communication traffic evaluation section 7 has a function of executing the processing for quantitatively evaluating the effects of optimization of the communication traffic characteristic executed by the optimization function based on the fact whether or not the variation distribution calculated by the communication traffic analyzing section 5 is the power function.

With the optimization evaluation system of the minimum structure shown in FIG. 7, it is possible to quantitatively evaluate the effects of the optimization of the traffic characteristic in the communication network.

In the embodiments described above, the feature structures of the optimization evaluation system and the optimization evaluation device as in (1)-(17) provided below are described.

(1) The optimization evaluation system is a system which evaluates effects of optimization done by an optimization function in a communication network that has the optimization function for optimizing a communication traffic characteristic, and the system is characterized to include: a communication traffic analyzing module (achieved by the communication traffic analyzing section 5, for example) which acquires a communication traffic variation distribution (e.g., the cumulative probability density distribution (CDF), the complementary cumulative probability density distribution (CCDF)) based on measured communication traffic data; and a communication traffic evaluation module (achieved by the communication traffic evaluation section 7, for example) which executes processing for quantitatively evaluating the effects of the optimization of the communication traffic characteristic executed by the optimization function based on a fact whether or not the variation distribution calculated by the communication traffic analyzing module is a power function.

(2) In the optimization evaluation system, the communication traffic evaluation module may be structured to: judge whether the variation distribution calculated by the communication traffic analyzing module is on a positive side or on a negative side with respect to the power function; judge that there is congestion generated in the communication traffic, when the variation distribution is on the positive side with respect to the power function; and judge that there is a margin in the communication traffic, when the variation distribution is on the negative side with respect to the power function.

(3) In the optimization evaluation system, the communication traffic evaluation module may be structured to: acquire a difference between the variation distribution calculated by the communication traffic analyzing module and the power function; and calculate the acquired difference between the variation distribution and the power function as an extent of the margin or an extent of the congestion in the communication traffic.

(4) The optimization evaluation system is a system which evaluates effects of optimization done by an optimization function in a communication network that has the optimization function for optimizing a communication traffic characteristic, and the system includes a traffic monitor (the traffic monitor 3, for example) that is disposed at a router (the router 1, for example) located at two hops or more stages before the band control device to observe a total communication traffic of outlet line of the router. The traffic monitor may be structured to include: a communication traffic measuring module (achieved by the communication traffic monitor section 4, for example) which observes the communication traffic and measures packet size or packet arrival interval of a communication packet; a communication traffic analyzing module (achieved by the communication traffic analyzing section 5, for example) which rebuilds observation data for each of the traffic characteristics based on a measurement result acquired by the communication traffic measuring module, supplies the traffic characteristic to be optimized that can be expressed by the traffic variation distribution and a variable X, and calculates the variation cumulative probability density distribution of the traffic characteristic which satisfies X≦x or a complementary distribution of the variation cumulative probability density distribution of the traffic characteristic which satisfies X≧x; a memory module (achieved by the memory module 6, for example) which stores threshold values of each of the traffic characteristics, the traffic characteristics, and observation start time as well as observation end time of each packet; a communication traffic evaluation module (achieved by the communication traffic evaluation section 7, for example) which compares the observation data of each traffic characteristic to a power function with an exponent of −1 when an origin is taken as 10 to the power of 0 by using an analyzed result acquired by the communication traffic analyzing module and information stored in the memory module, judges whether the observed communication traffic is in a state having a margin with respect to limits of the buffer of the router or the communication band or in a state with congestion generated by exceeding the limits of the buffer or the communication band, and acquires the extent of the margin and the extent of the congestion as an evaluation result; and a feedback module (achieved by the feedback section 8, for example) which performs processing for feeding back the evaluation result judged or acquired by the communication traffic evaluation section to a device or a system which has an optimization function.

(5) In the optimization evaluation system, the traffic evaluation module may be structured to: judge whether or not the power function with the exponent of −1 when the origin is taken as 10 to the power of 0 fits the variation cumulative probability density distribution of the communication traffic characteristic observed by the communication traffic measuring module within a range of 1 decade; judge as being in a state showing an optimum traffic efficiency by taking a fact that the power function fits the cumulative probability density distribution within the range of 1 decade as a condition that the variation cumulative probability density distribution of the observed communication traffic exhibits a power law; and acquire, as a scaling region, a fitting range of the power function and the cumulative probability density distribution as a comparison region when executing comparison processing with respect to a variation cumulative probability distribution of a communication traffic characteristic that is acquired by another measurement.

(6) In the optimization evaluation system, the traffic evaluation module may be structured to calculate the extent of the margin or the extent of the congestion of the communication traffic by acquiring a difference between the power function and the variation cumulative probability density distribution of the communication traffic characteristic acquired by the measurement in the scaling region where the cumulative probability density distribution is the power function with the exponent of −1 when the origin is taken as 10 to the power of 0 by using an average value on a horizontal axis of the scaling region.

(7) In the optimization evaluation system, the traffic evaluation module may be structured to calculate the extent of the margin or the extent of the congestion of the communication traffic by acquiring a difference between the power function and the variation cumulative probability density distribution of the communication traffic characteristic measured by the communication traffic measuring module in the scaling region where the cumulative probability density distribution is the power function with the exponent of −1 when the origin is taken as 10 to the power of 0 by using the power function with the exponent of −1 when the origin is taken as 10 to the power of 0 and some of the values on the horizontal axis of the scaling region in the cumulative probability density distribution of the data measured by the communication traffic measuring module.

(8) In the optimization evaluation system, the traffic evaluation module may be structured to calculate the extent of the margin or the extent of the congestion of the communication traffic by acquiring a difference between the power function and the variation cumulative probability density distribution of the communication traffic characteristic measured by the communication traffic measuring module in the scaling region where the cumulative probability density distribution is the power function with the exponent of −1 by using the power function with the exponent of −1 when the origin is taken as 10 to the power of 0 and a greatest value on the horizontal axis of the scaling region in the cumulative probability density distribution of the data measured by the communication traffic measuring module.

(9) In the optimization evaluation system, the traffic evaluation module may be structured to calculate the extent of the margin or the extent of the congestion of the communication traffic by acquiring a difference between the power function and the variation cumulative probability density distribution of the communication traffic characteristic measured by the communication traffic measuring module in the scaling region where the cumulative probability density distribution is the power function with the exponent of −1 as an integration value of differences between the power function with the exponent of −1 when the origin is taken as 10 to the power of 0 and the cumulative probability density distribution of the data measured by the communication traffic measuring module within the scaling region

(10) In the optimization evaluation system, the traffic evaluation module may be structured to perform fitting of the variation cumulative probability density distribution of the communication traffic characteristic measured by the communication traffic, measuring module and the power function with the exponent of −1 when the origin is taken as 10 to the power of 0 through a curve of a least-square or a linear approximation method by using the value acquired based on the traffic data measured by the communication traffic measuring module, a data result calculated in bilogarithm used for showing a normal power law, or a data result calculated by taking either the vertical axis or the horizontal axis as semilogarithm. variation cumulative probability density distribution of the communication traffic

(11) The optimization evaluation system may be structured to selectively dispose the traffic monitor in advance to a server connected to the router that is selected randomly from the routers as nodes with maximum number of outdegree by using an estimation result of structure of the communication network searched by using a traceroot command in a case where topology of the measurement-target network is unknown.

(12) The optimization evaluation system may be structured to dispose the traffic monitor in advance on a server that is connected to the router with a large value of Betweenness function in a case where topology of the measurement-target network is known and the outdegree distribution of the node exhibits the power law.

(13) The optimization evaluation system includes a center node (the center node 9, for example), and the traffic monitor may be structured to transmit information showing the variation cumulative probability density of the communication traffic characteristic measured by the communication traffic measuring module to the center node; and the center node may be structured to detect an error between the traffic monitors by comparing the information showing the cumulative probability density distribution received from each traffic monitor.

(14) The optimization evaluation system may be structured to provide an evaluation system that is capable of evaluating how optimally the optimization methods or the variables set in the optimization method are working in regards to the optimization method that optimizes the optimization of a prescribed communication traffic efficiency by paying attentions to the fact that the traffic efficiency of the communication network, particularly the communication network having the feedback mechanism and the buffer function becomes the optimum at the critical point of the phase transition and the communication traffic variation distribution when the traffic efficiency becomes the optimum exhibits the power law distribution with the exponent of −1 when the origin is taken as 10 to the power of 0.

(15) In the optimization evaluation system, the traffic evaluation module may be structured to judge as being in a state where there is a margin in the communication traffic due to the employed optimization method and the set variables of the optimization method in a case where the variation cumulative probability density distribution of the communication traffic characteristic measured by the communication traffic measuring module is on the negative side with respect to the power function in the scaling region where the cumulative probability density distribution exhibits the power function with the exponent of −1 when the origin is taken as 10 to the power of 0, and to judge as being in a state where there is congestion generated in the communication traffic in a case where the cumulative probability density distribution is on the positive side with respect to the power function in the scaling region.

(16) In the optimization evaluation system, the center node may be structured to: analyze the time-series traffic variation by each traffic monitor by using the cumulative probability density distribution of the traffic variation stored in the memory module which satisfies $X \geqq x$ or the complementary distribution thereof which satisfies $X<x$, the observation start time, and the observation end time; and calculate a Lyapunov exponent or a Hurst exponent to judge whether or not the optimization method employed in the communication traffic for the chronological changes of the network and the set variables on the optimization method will be effective thereinafter.

(17) The optimization evaluation device is an optimization evaluation device (the traffic monitor 3, for example) which evaluates effects of optimization done by an optimization function in a communication network that has the optimization function for optimizing a communication traffic characteristic, and the device is characterized to include: a communication traffic analyzing module (achieved by the communication traffic analyzing section 5, for example) which acquires a communication traffic variation distribution of the communication traffic (e.g., the cumulative probability density distribution (CDF), the complementary cumulative probability density distribution (CCDF)) based on measured communication traffic data; and a communication traffic evaluation module (achieved by the communication traffic evaluation section 7, for example) which executes processing for quantitatively evaluating the effects of the optimization of the communication traffic characteristic executed by the optimization function based on a fact whether or not the variation distribution calculated by the communication traffic analyzing module is a power function.

While the present invention has been described by referring to the embodiments (and examples), the present invention is not limited only to those embodiments (and examples) described above. Various kinds of modifications that occur to those skilled in the art can be applied to the structures and details of the present invention within the scope of the present invention.

INDUSTRIAL APPLICABILITY

The present invention can be applied to evaluate the effects of the optimization of the communication traffic characteristic in almost all the existing communications networks such as the Internet, networks managed by Internet service providers, local area networks (LAN), and other small-scaled as well as large-scaled communication networks. Particularly, the present invention can be applied to quantitatively evaluate the effectiveness of the optimization techniques used for the traffic characteristic in the communication network that has the feedback mechanism and the buffer (or delay) mechanism, and the effectiveness of the optimization variables. Furthermore, the present invention can be applied to evaluate how optimum the optimization techniques and the variables set in the optimization techniques are working.

REFERENCE NUMERALS

Figure 1:
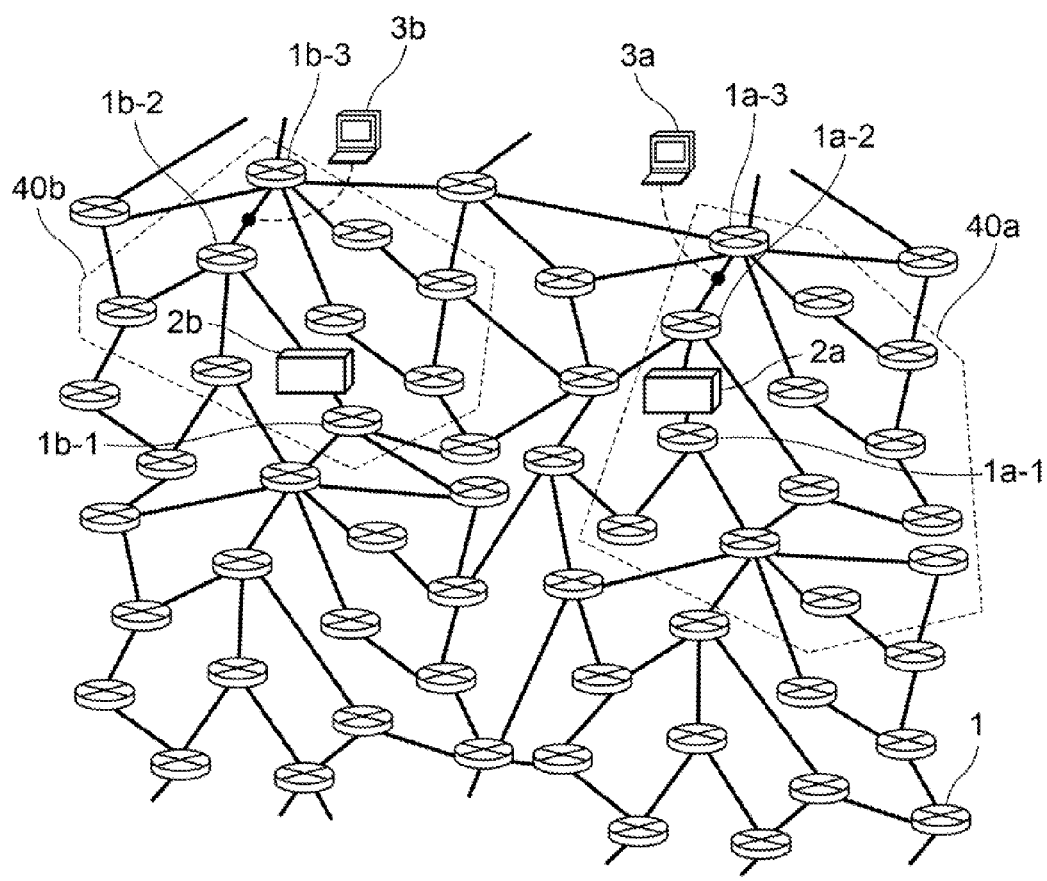
FIG. 1 is a block diagram showing an example of the structure of an optimization evaluation system according to the present invention.
Figure 2:
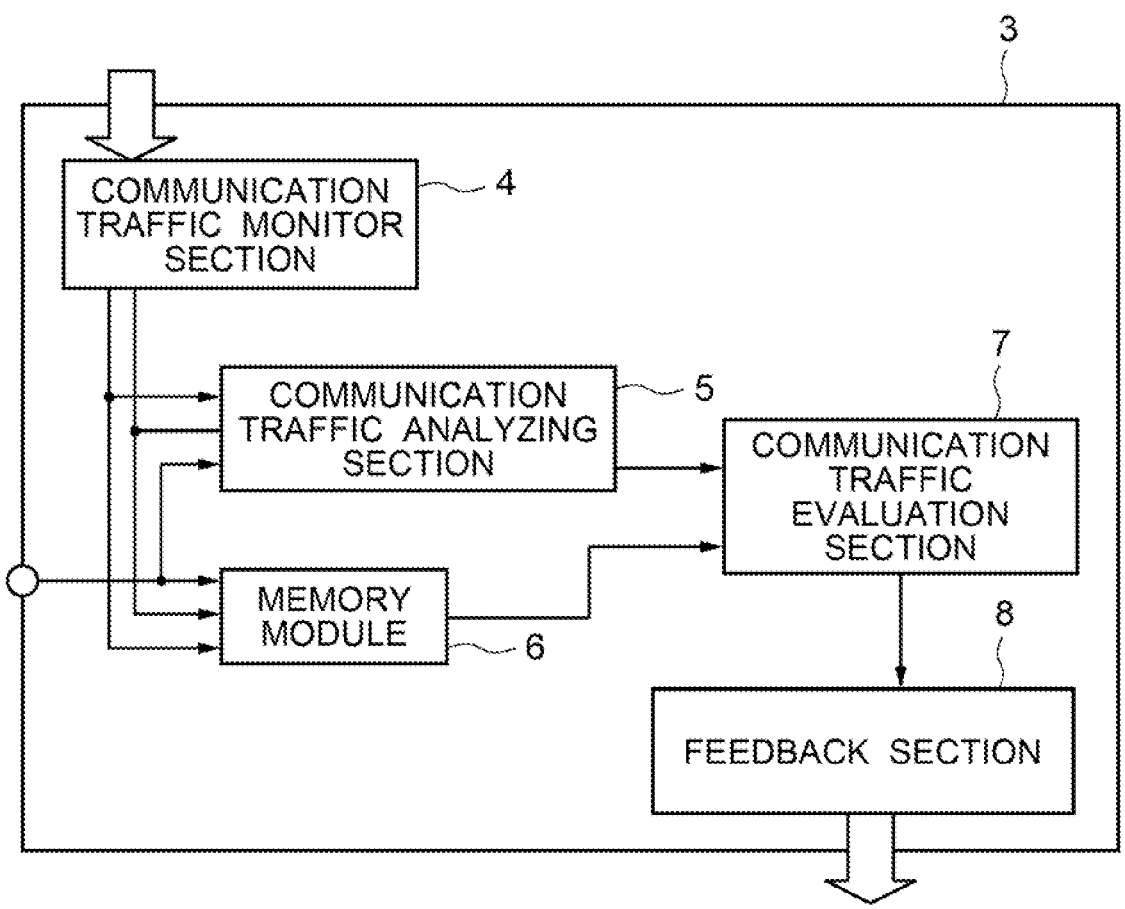
FIG. 2 is a block diagram showing an example of the structure of a traffic monitor.
Figure 3:
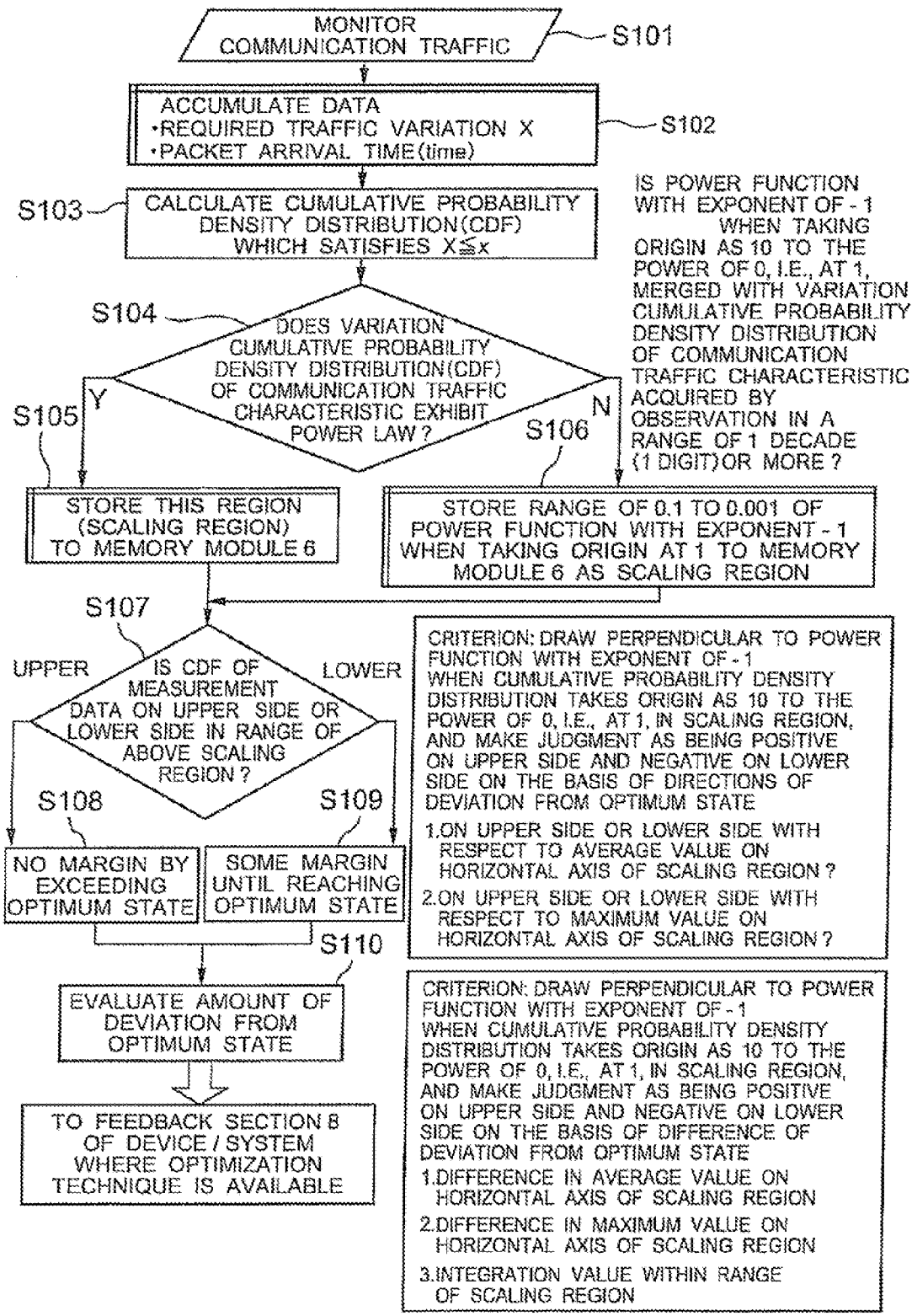
FIG. 3 is a flowchart showing an example of processing executed by the optimization evaluation system for evaluating effects of optimization of the communication traffic characteristic.
Figure 4:
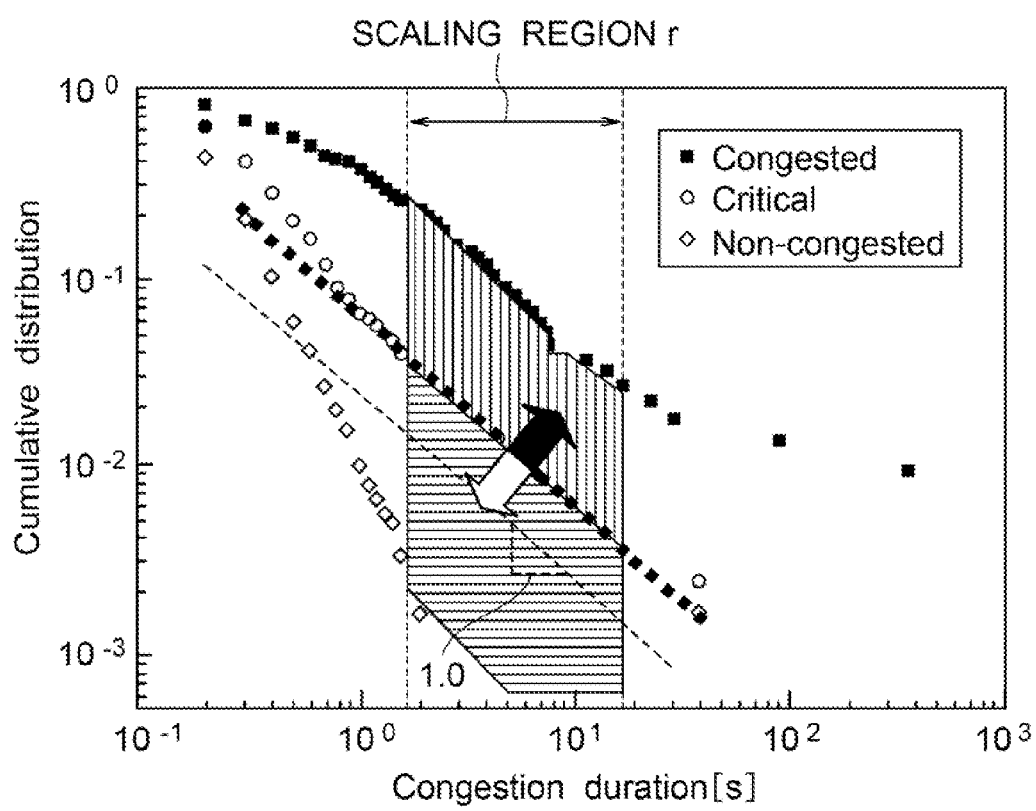
FIG. 4 is an explanatory chart showing an example of a quantitative evaluation technique of an optimization technique.
Figure 5:
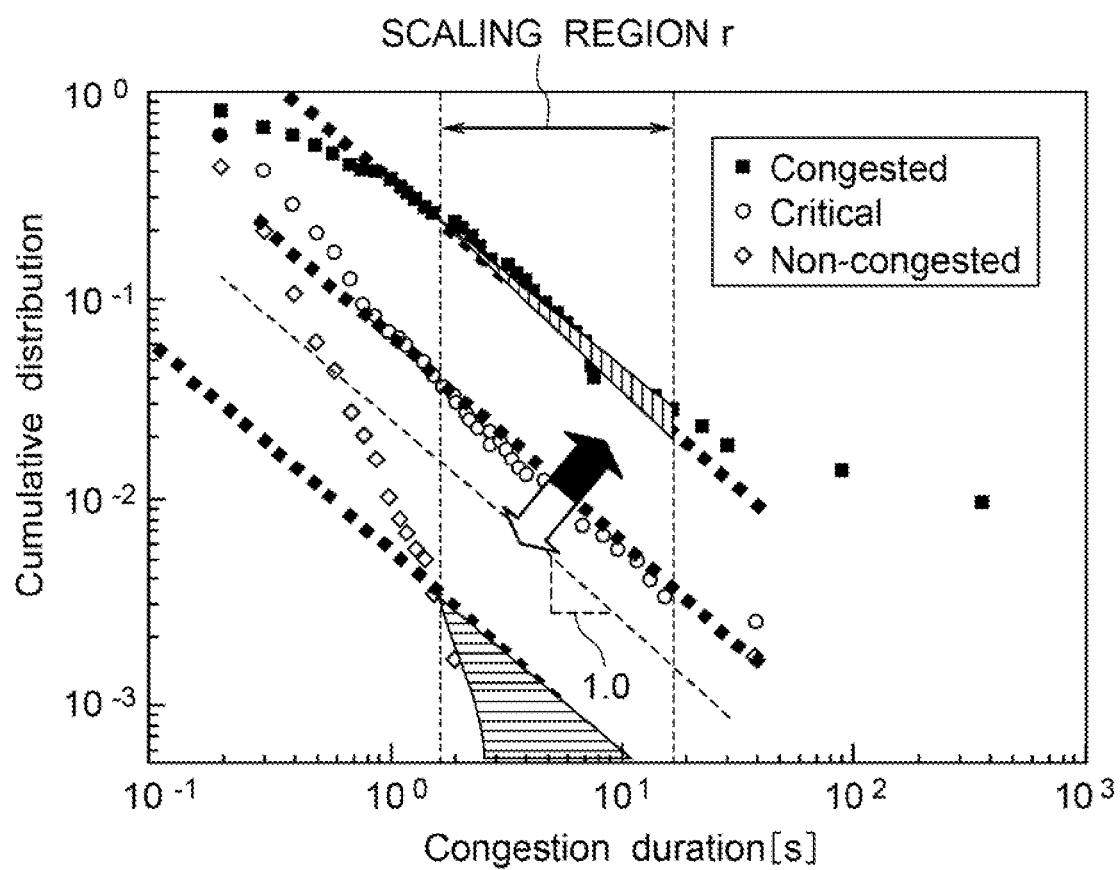
FIG. 5 is an explanatory chart showing another example of the quantitative evaluation technique of the optimization technique.
Figure 6:
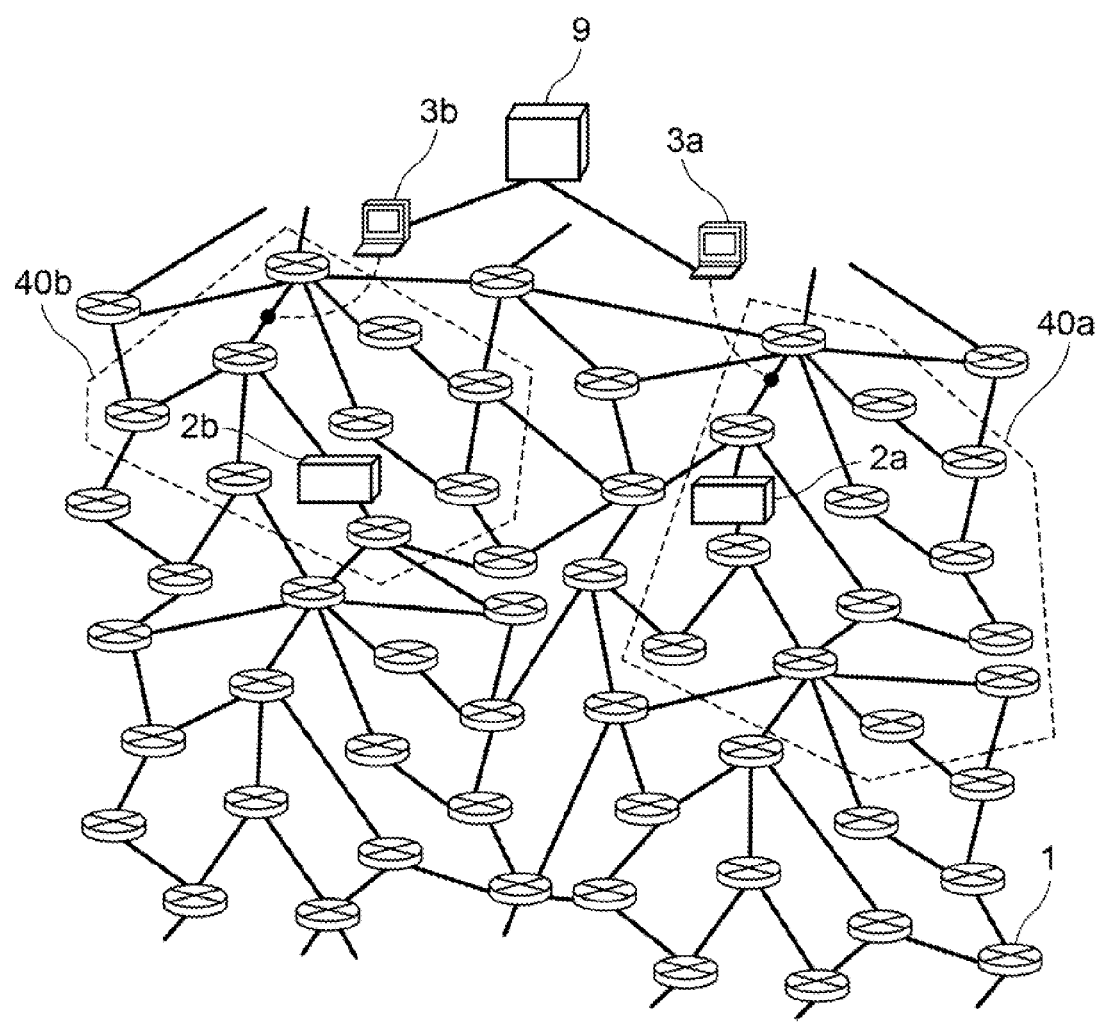
FIG. 6 is a block diagram showing an example of the structure of an optimization evaluation system according to a second embodiment.
Figure 7:
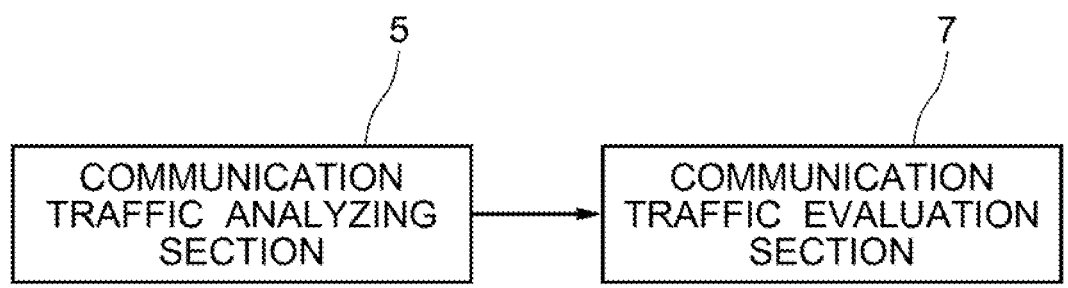
FIG. 7 is a block diagram showing an example of the minimum structure of the optimization evaluation system.

1 Router
2 Band control device
3 Traffic monitor
4 Communication traffic monitor section
5 Communication traffic analyzing section
6 Memory module
7 Communication traffic evaluation section
8 Feedback section
9 Center node

The invention claimed is:

1. An optimization evaluation system which evaluates effects of optimization done by an optimization function in a communication network that has the optimization function for optimizing a communication traffic characteristic, the system comprising a traffic monitor that is disposed at a router located at two hops or more stages before a band control device to observe a total communication traffic of outlet line of the router, wherein the traffic monitor includes:
a communication traffic measuring module which observes the communication traffic and measures packet size or packet arrival interval of a communication packet;
a communication traffic analyzing module which rebuilds observation data for each of the traffic characteristics based on a measurement result acquired by the communication traffic measuring module, supplies the traffic characteristic to be optimized that can be expressed by the traffic variation distribution and a variable, and calculates the variation cumulative probability density distribution of the traffic characteristic which satisfies a first condition in which the variable is less than or equal to a value or a complementary distribution of the variation cumulative probability density distribution of the traffic characteristic which satisfies a second condition in which the variable is greater than or equal to the value;
a memory module which stores threshold values of each of the traffic characteristics, the traffic characteristics, and observation start time as well as observation end time of each packet;
a communication traffic evaluation module which compares the observation data of each traffic characteristic to a power function with an exponent of −1 to −1.3 when an origin is taken as 10 to power of 0 by using an analyzed result acquired by the communication traffic analyzing module and information stored in the memory module, judges whether the observed communication traffic is in a state having a margin with respect to limits of the buffer of the router or the communication band or in a state having congestion generated by exceeding the limits of the buffer or the communication band, and acquires the extent of the margin and the extent of the congestion as an evaluation result;
a feedback module which performs processing for feeding back the evaluation result judged or acquired by the communication traffic evaluation section to a device or a system which has an optimization function; and
a center node, wherein:
the traffic monitor is one of a plurality of traffic monitors;
the traffic monitor transmits information showing the variation cumulative probability density of the communication traffic characteristic measured by the communication traffic measuring module to the center node; and
the center node detects errors among the traffic monitors by comparing the information showing the cumulative probability density distribution received from each traffic monitor.

2. The optimization evaluation system as claimed in claim 1, wherein the traffic evaluation module:
judges whether or not the power function with the exponent of −1 when the origin is taken as 10 to the power of 0 fits the variation cumulative probability density distribution of the communication traffic characteristic measured by the communication traffic measuring module within a range of 1 decade;
judges as being in a state showing an optimum traffic efficiency by taking a fact that the power function fits the cumulative probability density distribution within the range of 1 decade as a condition that the variation cumulative probability density distribution of the observed communication traffic characteristic exhibits a power law; and
acquires, as a scaling region, a fitting range of the power function and the cumulative probability density distribution as a comparison region when executing comparison processing with respect to a variation cumulative probability distribution of a communication traffic characteristic that is acquired by another measurement.

3. The optimization evaluation system as claimed in claim 2, wherein
the traffic evaluation module calculates the extent of the margin or the extent of the congestion of the communication traffic by acquiring a difference between the power function and the variation cumulative probability density distribution of the communication traffic characteristic acquired by the measurement in the scaling region where the cumulative probability density distribution is the power function with the exponent of −1 when the origin is taken as 10 to the power of 0 by using an average value on a horizontal axis of the scaling region.

4. The optimization evaluation system as claimed in claim 3, wherein
the traffic evaluation module calculates the extent of the margin or the extent of the congestion of the communication traffic by acquiring a difference between the power function and the variation cumulative probability density distribution of the communication traffic characteristic measured by the communication traffic measuring module in the scaling region where the cumulative probability density distribution is the power function with the exponent of −1 when the origin is taken 10 to the power of 0 by using the power function with the exponent of −1 when the origin is taken as 10 to the power of 0 and some of the values on the horizontal axis of the scaling region in the cumulative probability density distribution of the data measured by the communication traffic measuring module.

5. The optimization evaluation system as claimed in claim 3, wherein
the traffic evaluation module calculates the extent of the margin or the extent of the congestion of the communication traffic by acquiring a difference between the power function and the variation cumulative probability density distribution of the communication traffic characteristic measured by the communication traffic measuring module in the scaling region where the cumulative probability density distribution is the power function with the exponent of −1 by using the power function with the exponent of −1 when the origin is taken as 10 to the power of 0 and a greatest value on the horizontal axis of the scaling region in the cumulative probability density distribution of the data measured by the communication traffic measuring module.

6. The optimization evaluation system as claimed in claim 3, wherein
the traffic evaluation module calculates the extent of the margin or the extent of the congestion of the communication traffic by acquiring a difference between the power function and the variation cumulative probability density distribution of the communication traffic characteristic measured by the communication traffic measuring module in the scaling region where the cumulative probability density distribution is the power function with the exponent of −1 as an integration value of differences between the power function with the exponent of −1 when the origin is taken as 10 to the power of 0 and the cumulative probability density distribution of the data measured by the communication traffic measuring module within the scaling region.

7. The optimization evaluation system as claimed in claim 2, wherein the traffic evaluation module performs fitting of the variation cumulative probability density distribution of the communication traffic characteristic measured by the communication traffic measuring module and the power function with the exponent of −1 when the origin is taken as 10 to the power of 0 through a curve of a least-square or a linear approximation method by using the value acquired based on the traffic data measured by the communication traffic measuring module, a data result calculated in bilogarithm used for showing a normal power law, or a data result calculated by taking either the vertical axis or the horizontal axis as semilogarithm.

8. The optimization evaluation system as claimed in claim 1, which selectively includes the traffic monitor in advance to a server connected to the router that is selected randomly from the routers as nodes with maximum number of outdegrees by using an estimation result of structure of the communication network searched by using a traceroot command in a case where topology of the measurement-target network is unknown.

9. The optimization evaluation system as claimed in claim 1, which includes the traffic monitor in advance on a server that is connected to the router with a large value of Betweenness function in a case where topology of the measurement-target network is known and the outdegree distribution of the node exhibits the power law.

10. An optimization evaluation device which evaluates effects of optimization done by an optimization function in a communication network that has the optimization function for optimizing a communication traffic characteristic, which is disposed at a router located at two hops or more stages before a band control device, the optimization evaluation device comprising:
a communication traffic measuring module which observes a total communication traffic of outlet line of the router, and measures packet size or packet arrival interval of a communication packet;
a communication traffic analyzing module which rebuilds observation data for each of the traffic characteristics based on a measurement result acquired by the communication traffic measuring module, supplies the traffic characteristic to be optimized that can be expressed by the traffic variation distribution and a variable, and calculates the variation cumulative probability density distribution of the traffic characteristic which satisfies a first condition in which the variable is less than or equal to a value or a complementary distribution of the variation cumulative probability density distribution of the traffic characteristic which satisfies a second condition in which the variable is greater than or equal to the value;
a memory module which stores threshold values of each of the traffic characteristics, the traffic characteristics, and observation start time as well as observation end time of each packet;
a communication traffic evaluation module which compares the observation data of each traffic characteristic to a power function with an exponent of −1 when an origin is taken as 10 to the power of 0 by using an analyzed result acquired by the communication traffic analyzing module and information stored in the memory module, judges whether the observed communication traffic is in a state having a margin with respect to limits of the buffer of the router or the communication band or in a state with congestion generated by exceeding the limits of the buffer or the communication band, and acquires the extent of the margin and the extent of the congestion as an evaluation result; and
a feedback module which performs processing for feeding back the evaluation result judged or acquired by the communication traffic evaluation section to a device or a system which has an optimization function, wherein:
the optimization evaluation device transmits information showing the variation cumulative probability density of the communication traffic characteristic measured by the communication traffic measuring module to a center node; and the center node detects errors among a plurality of traffic monitors by comparing the information showing the cumulative probability density distribution received from each traffic monitor.

11. The optimization evaluation device as claimed in claim 10, wherein the traffic evaluation module:
- judges whether or not the power function with the exponent of −1 when the origin is taken as 10 to the power of 0 fits the variation cumulative probability density distribution of the communication traffic characteristic measured by the communication traffic measuring module within a range of 1 decade;
- judges as being in a state showing an optimum traffic efficiency by taking a fact that the power function fits the cumulative probability density distribution within the range of 1 decade as a condition that the variation cumulative probability density distribution of the measured communication traffic characteristic exhibits a power law; and
- acquires, as a scaling region, a fitting range of the power function and the cumulative probability density distribution as a comparison region when executing comparison processing with respect to a variation cumulative probability distribution of a communication traffic characteristic that is acquired by another measurement.

12. The optimization evaluation device as claimed in claim 11, wherein
the traffic evaluation module calculates the extent of the margin or the extent of the congestion of the communication traffic by acquiring a difference between the power function and the variation cumulative probability density distribution of the communication traffic characteristic acquired by the measurement in the scaling region where the cumulative probability density distribution is the power function with the exponent of −1 when the origin is taken as 10 to the power of 0 by using an average value on a horizontal axis of the scaling region.

13. The optimization evaluation device as claimed in claim 12, wherein
the traffic evaluation module calculates the extent of the margin or the extent of the congestion of the communication traffic by acquiring a difference between the power function and the variation cumulative probability density distribution of the communication traffic characteristic measured by the communication traffic measuring module in the scaling region where the cumulative probability density distribution is the power function with the exponent of −1 when the origin is taken as 10 to the power of 0 by using the power function with the exponent of −1 when the origin is taken as 10 to the power of 0 and some of the values on the horizontal axis of the scaling region in the cumulative probability density distribution of the data measured by the communication traffic measuring module.

14. The optimization evaluation device as claimed in claim 12, wherein
the traffic evaluation module calculates the extent of the margin or the extent of the congestion of the communication traffic by acquiring a difference between the power function and the variation cumulative probability density distribution of the communication traffic characteristic measured by the communication traffic measuring module in the scaling region where the cumulative probability density distribution is the power function with the exponent of −1 by using the power function with the exponent of −1 when the origin is taken as 10 to the power of 0 and a greatest value of the scaling region in the cumulative probability density distribution of the data measured by the communication traffic measuring module.

15. The optimization evaluation device as claimed in claim 12, wherein
the traffic evaluation module calculates the extent of the margin or the extent of the congestion of the communication traffic by acquiring a difference between the power function and the variation cumulative probability density distribution of the communication traffic characteristic measured by the communication traffic measuring module in the scaling region where the cumulative probability density distribution is the power function with the exponent of −1 as an integration value of differences between the power function with the exponent of −1 when the origin is taken as 10 to the power of 0 and the cumulative probability density distribution of the data measured by the communication traffic measuring module within the scaling region.

16. The optimization evaluation device as claimed in claim 11, wherein the traffic evaluation module performs fitting of the variation cumulative probability density distribution of the communication traffic characteristic measured by the communication traffic measuring module and the power function with the exponent of −1 when the origin is taken as 10 to the power of 0 through a curve of a least-square or a linear approximation method by using the value acquired based on the traffic data measured by the communication traffic measuring module, a data result calculated in bilogarithm used for showing a normal power law, or a data result calculated by taking either the vertical axis or the horizontal axis as semilogarithm.

17. The optimization evaluation device as claimed in claim 10, which is selectively disposed in advance to a server connected to the router that is selected randomly from the routers as nodes with maximum number of outdegrees by using an estimation result of structure of the communication network searched by using a traceroot command in a case where topology of the measurement-target network is unknown.

18. The optimization evaluation device as claimed in claim 10, which is disposed in advance on a server that is connected to the router with a large value of Betweenness function in a case where topology of the measurement-target network is known and the outdegree distribution of the node exhibits the power law.

19. An optimization evaluation method which evaluates effects of optimization done by an optimization function in a communication network that has the optimization function for optimizing a communication traffic characteristic, the method implemented in a traffic monitor that is disposed at a router located at two hops or more stages before a band control device to observe a total communication traffic of outlet line of the router, wherein
the traffic monitor executes:
- processing that observes the communication traffic and measures packet size or packet arrival interval of a communication packet;
- processing that rebuilds observation data for each of the traffic characteristics based on the measurement result, supplies the traffic characteristic to be optimized that can be expressed by the traffic variation distribution and a variable, and calculates the variation cumulative probability density distribution of the traffic characteristic which satisfies a first condition in which the variable is less than or equal to a value or a complementary distribution of the variation cumulative probability density distribution of the traffic characteristic which satisfies a second condition in which the variable is greater than or equal to the value;

processing that compares the observation data of each traffic characteristic to a power function with an exponent of $-1$ when an origin is taken as 10 to power of 0 by using stored threshold values of each traffic characteristic, the traffic characteristics, observation start time as well as observation end time of each packet, and a calculated result of the complementary distribution, judges whether the observed communication traffic is in a state having a margin with respect to limits of the buffer of the router or the communication band or in a state having congestion generated by exceeding the limits of the buffer or the communication band, and acquires the extent of the margin and the extent of the congestion as an evaluation result; and processing that feeds back the judged or acquired evaluation result to a device or a system which has an optimization function, wherein:

the traffic monitor is one of a plurality of traffic monitors;
the traffic monitor transmits information showing the variation cumulative probability density of the communication traffic characteristic measured by the communication traffic measuring module to a center node; and the center node detects errors among the traffic monitors by comparing the information showing the cumulative probability density distribution received from each traffic monitor.

* * * * *